US010543656B2

(12) United States Patent
Peters et al.

(10) Patent No.: US 10,543,656 B2
(45) Date of Patent: Jan. 28, 2020

(54) TOUGH SHRINKABLE FILMS

(71) Applicant: Eastman Chemical Company, Kingsport, TN (US)

(72) Inventors: Mark Allen Peters, Jonesborough, TN (US); James Carl Williams, Blountville, TN (US); Rondell Paul Little, Jr., Johnson City, TN (US); James Wesley Peer, Kingsport, TN (US); Jacob E. Napierala, Johnson City, TN (US)

(73) Assignee: Eastman Chemical Company, Kingsport, TN (US)

( * ) Notice: Subject to any disclaimer, the term of this patent is extended or adjusted under 35 U.S.C. 154(b) by 176 days.

(21) Appl. No.: 15/867,848

(22) Filed: Jan. 11, 2018

(65) Prior Publication Data

US 2019/0211167 A1    Jul. 11, 2019

(51) Int. Cl.
| | | |
|---|---|---|
| *B32B 1/08* | (2006.01) |
| *C08G 63/181* | (2006.01) |
| *C08J 5/18* | (2006.01) |
| *C08G 63/199* | (2006.01) |
| *C08G 63/16* | (2006.01) |
| *C08L 67/00* | (2006.01) |
| *C08L 67/02* | (2006.01) |
| *B32B 1/02* | (2006.01) |
| *C08L 67/04* | (2006.01) |
| *C08L 69/00* | (2006.01) |
| *C08G 63/183* | (2006.01) |
| *C08G 63/672* | (2006.01) |
| *B29K 67/00* | (2006.01) |
| *B29C 55/02* | (2006.01) |

(52) U.S. Cl.
CPC ............. *B32B 1/08* (2013.01); *B32B 1/02* (2013.01); *C08G 63/16* (2013.01); *C08G 63/181* (2013.01); *C08G 63/183* (2013.01); *C08G 63/199* (2013.01); *C08G 63/672* (2013.01); *C08J 5/18* (2013.01); *C08L 67/00* (2013.01); *C08L 67/02* (2013.01); *C08L 67/025* (2013.01); *C08L 67/04* (2013.01); *C08L 69/00* (2013.01); *B29C 55/02* (2013.01); *B29K 2067/00* (2013.01); *C08J 2367/02* (2013.01)

(58) Field of Classification Search
CPC .......... C08L 67/00; C08L 67/02; C08L 67/04; C08L 69/00; C08G 63/16; C08G 63/199; C08G 63/181; B32B 1/02; B32B 1/08
See application file for complete search history.

(56) References Cited

U.S. PATENT DOCUMENTS

| | | |
|---|---|---|
| 2,720,507 A | 10/1955 | Caldwell |
| 3,426,754 A | 2/1969 | Bierenbaum et al. |
| 3,772,405 A | 11/1973 | Hamb |
| 3,944,699 A | 3/1976 | Mathews et al. |
| 4,138,459 A | 2/1979 | Brazinsky et al. |
| 4,578,437 A | 3/1986 | Light |
| 4,582,752 A | 4/1986 | Duncan |
| 4,632,869 A | 12/1986 | Park et al. |
| 4,770,931 A | 9/1988 | Pollock et al. |
| 4,939,232 A | 7/1990 | Fukuda |
| 4,985,538 A | 1/1991 | Fukuda |
| 5,176,954 A | 1/1993 | Keller et al. |
| 5,340,624 A | 8/1994 | Sublett |
| 5,372,864 A | 12/1994 | Weaver et al. |
| 5,384,377 A | 1/1995 | Weaver et al. |
| 5,385,773 A | 1/1995 | Yau |
| 5,435,955 A | 7/1995 | Kamei |
| 5,567,758 A | 10/1996 | Kinami et al. |
| 5,573,820 A | 11/1996 | Harazoe |
| 5,589,126 A | 12/1996 | Shih |
| 5,654,347 A | 8/1997 | Khemani et al. |
| 5,658,626 A | 8/1997 | Kuze et al. |
| 5,668,243 A | 9/1997 | Yau |

(Continued)

FOREIGN PATENT DOCUMENTS

| | | |
|---|---|---|
| CA | 2 169 300 | 8/1998 |
| EP | 0 214 859 A2 | 3/1987 |

(Continued)

OTHER PUBLICATIONS

Notification of Transmittal of the International Search Report and the Written Opinion of the International Searching Authority, or the Declaration dated Apr. 8, 2019 received in International Application No. PCT/US2018/065089.

*Primary Examiner* — Walter Aughenbaugh
(74) *Attorney, Agent, or Firm* — Tammye L. Taylor

(57) ABSTRACT

The present disclosure relates to a shrink film comprising a polyester composition comprising:
(1) at least one polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
    (i) about 0.01 to about 30 mole % neopentyl glycol residues;
    (ii) about 0.01 to about less than 15 mole % 1,4-cyclohexanedimethanol residues;
    (iii) about 50 to 90 mole % ethylene glycol residues; and
    (iv) about 2 to 15 mole % total diethylene glycol residues in the final polyester composition;
  wherein the total mole % of the dicarboxylic acid component is 100 mole %, and
  wherein the total mole % of the diol component is 100 mole %.

21 Claims, No Drawings

(56) References Cited

U.S. PATENT DOCUMENTS

| | | |
|---|---|---|
| 5,668,899 A | 9/1997 | Jadrich |
| 5,696,176 A | 12/1997 | Khemani et al. |
| 5,744,571 A | 4/1998 | Hilbert |
| 5,753,377 A | 5/1998 | Takahashi et al. |
| 5,843,578 A | 12/1998 | Sasaki et al. |
| 5,852,164 A | 12/1998 | Akai et al. |
| 5,858,507 A | 1/1999 | Yoshida et al. |
| 5,859,116 A | 1/1999 | Shih |
| 5,922,164 A | 7/1999 | Kimura et al. |
| 5,932,685 A | 8/1999 | Mori et al. |
| 5,985,387 A | 11/1999 | Mori et al. |
| 6,004,664 A | 12/1999 | Sasaki et al. |
| 6,068,910 A | 5/2000 | Flynn et al. |
| 6,086,989 A | 7/2000 | Kubo et al. |
| 6,120,889 A | 9/2000 | Turner |
| 6,139,954 A | 10/2000 | Dean et al. |
| 6,197,430 B1 | 3/2001 | Asakura et al. |
| 6,231,958 B1 | 5/2001 | Kim |
| 6,242,560 B1 | 6/2001 | Gyobu et al. |
| 6,270,866 B1 | 8/2001 | Okuda et al. |
| 6,287,656 B1 | 9/2001 | Turner et al. |
| 6,287,667 B1 | 9/2001 | Kinoshita et al. |
| 6,287,680 B1 | 9/2001 | Sasaki et al. |
| 6,306,496 B1 | 10/2001 | Endo |
| 6,342,281 B2 | 1/2002 | Hayakawa et al. |
| 6,362,306 B1 | 3/2002 | Shelby et al. |
| 6,383,627 B2 | 5/2002 | Hashimoto et al. |
| 6,413,596 B1 | 7/2002 | Okuda |
| 6,447,925 B1 | 9/2002 | Tabota et al. |
| 6,451,445 B1 | 9/2002 | Ito et al. |
| 6,458,437 B1 | 10/2002 | Ito et al. |
| 6,465,063 B1 | 10/2002 | Hayakawa et al. |
| 6,485,810 B1 | 11/2002 | Uchida |
| 6,500,533 B1 | 12/2002 | Kong et al. |
| 6,503,599 B1 | 1/2003 | Tojo |
| 6,548,595 B2 | 4/2003 | Ito et al. |
| 6,599,994 B2 | 7/2003 | Shelby et al. |
| 6,653,440 B2 | 11/2003 | Hirokane et al. |
| 6,663,928 B2 | 12/2003 | Ito et al. |
| 6,720,085 B2 | 4/2004 | Ito et al. |
| 6,761,966 B2 | 7/2004 | Ito et al. |
| 6,902,819 B2 | 6/2005 | Kim |
| 6,939,616 B2 | 9/2005 | Hayakawa et al. |
| 6,958,178 B2 | 10/2005 | Hayakawa et al. |
| 7,001,651 B2 | 2/2006 | Hayakawa et al. |
| 7,008,698 B2 | 3/2006 | Marlow et al. |
| 7,074,467 B2 | 7/2006 | Kim et al. |
| 7,078,105 B2 | 7/2006 | MacKerron |
| 7,078,476 B2 | 7/2006 | Woong |
| 7,128,863 B2 | 10/2006 | Kim et al. |
| 7,129,317 B2 | 10/2006 | Moore et al. |
| 7,166,342 B2 | 1/2007 | Hayakawa et al. |
| 7,198,857 B2 | 4/2007 | Kumano et al. |
| 7,250,485 B2 | 7/2007 | Ito et al. |
| 7,279,204 B2 | 10/2007 | Ito et al. |
| 7,306,835 B2 | 12/2007 | Hong |
| 7,349,317 B2 | 3/2008 | Maeda et al. |
| 7,399,518 B2 | 7/2008 | Ito |
| 7,439,317 B2 | 10/2008 | Suzuki et al. |
| 7,514,141 B2 | 4/2009 | Klein et al. |
| 7,582,369 B2 | 9/2009 | Kobayashi |
| 7,749,584 B2 | 7/2010 | Hayakawa et al. |
| 7,829,655 B2 | 11/2010 | Endo et al. |
| 7,939,174 B2 | 5/2011 | Hayakawa et al. |
| 8,093,316 B2 | 1/2012 | Pearson et al. |
| 8,206,797 B2 | 6/2012 | Haruta et al. |
| 8,263,731 B2 | 9/2012 | Liu et al. |
| 8,304,510 B2 | 11/2012 | Thompson et al. |
| 8,318,893 B2 | 11/2012 | Hoshino et al. |
| 8,329,828 B2 | 12/2012 | Endo et al. |
| 8,507,057 B2 | 8/2013 | Kim et al. |
| 8,512,833 B2 | 8/2013 | Oh et al. |
| 8,518,551 B2 | 8/2013 | Tojo |
| 8,524,343 B2 | 9/2013 | Thompson et al. |
| 8,557,951 B2 | 10/2013 | Lee et al. |
| 8,568,841 B2 | 10/2013 | Kim et al. |
| 8,632,865 B2 | 1/2014 | Kim et al. |
| 8,673,414 B2 | 3/2014 | Haruta et al. |
| 8,685,305 B2 | 4/2014 | Haruta et al. |
| 8,722,161 B2 | 5/2014 | Haruta et al. |
| 8,742,058 B2 | 6/2014 | Horie et al. |
| 8,815,994 B2 | 8/2014 | Kim et al. |
| 8,986,591 B2 | 3/2015 | Shelby et al. |
| 8,993,109 B2 | 3/2015 | Yamamoto et al. |
| 9,017,782 B2 | 4/2015 | Haruta |
| 9,080,027 B2 | 7/2015 | Haruta |
| 9,150,006 B2 | 10/2015 | Neill et al. |
| 9,187,637 B2 | 11/2015 | Kim et al. |
| 9,273,182 B2 | 3/2016 | Matsumoto et al. |
| 9,296,867 B2 | 3/2016 | Haruta |
| 9,352,508 B2 | 5/2016 | Haruta et al. |
| 9,375,902 B2 | 6/2016 | Manabe et al. |
| 9,410,014 B2 | 8/2016 | Salsman |
| 2001/0036545 A1 | 11/2001 | Nishi et al. |
| 2003/0068453 A1 | 4/2003 | Kong |
| 2003/0165671 A1 | 9/2003 | Hashimoto et al. |
| 2003/0170427 A1 | 9/2003 | Ito et al. |
| 2006/0121219 A1 | 6/2006 | Shelby et al. |
| 2006/0249715 A1 | 11/2006 | Salyer et al. |
| 2007/0004813 A1 | 1/2007 | Shelby et al. |
| 2008/0241769 A1 | 10/2008 | Quintens |
| 2009/0074998 A1 | 3/2009 | Hiruma et al. |
| 2009/0227735 A1 | 9/2009 | Shih |
| 2011/0081510 A1 | 4/2011 | Shih et al. |
| 2013/0095371 A1 | 4/2013 | Zaikov |
| 2014/0162042 A1 | 6/2014 | Shih et al. |
| 2016/0122485 A1 | 5/2016 | Lim |
| 2016/0237207 A1 | 8/2016 | Ohashi |

FOREIGN PATENT DOCUMENTS

| | | |
|---|---|---|
| EP | 0 581 970 B1 | 8/1998 |
| EP | 0 934 813 A2 | 8/1999 |
| EP | 1 439 201 A1 | 7/2004 |
| EP | 2 631 261 A2 | 8/2013 |
| JP | 61-37827 A | 2/1986 |
| JP | H0753737 A | 2/1995 |
| JP | H0733063 | 4/1995 |
| JP | 2006028 | 1/1996 |
| JP | 2596287 | 4/1997 |
| JP | 2781598 | 7/1998 |
| JP | 2793713 B2 | 9/1998 |
| JP | 2004181863 | 7/2004 |
| JP | 4439778 | 3/2010 |
| JP | 2015136797 | 7/2015 |
| KR | 19950008582 | 4/1995 |
| KR | 10087413 | 2/2008 |
| WO | WO 2004 069896 A1 | 8/2004 |
| WO | WO 2011 043938 A1 | 4/2011 |
| WO | WO 2013 056011 A1 | 4/2013 |

TOUGH SHRINKABLE FILMS

FIELD OF THE INVENTION

The present disclosure relates to shrinkable films comprising polyester compositions which comprise residues of terephthalic acid, neopentyl glycol (NPG), 1,4-cyclohexanedimethanol (CHDM), ethylene glycol (EG), and diethylene glycol (DEG), in certain compositional ranges having certain advantages and improved properties.

BACKGROUND OF THE INVENTION

There is a commercial need for shrink films that have at least one of the following desirable shrink film properties; (1) low onset shrinkage temperature, (2) a shrinkage percentage which increases gradually and in a controlled manner with increasing temperature over the temperature range where shrinkage occurs, (3) a shrink force low enough to prevent crushing of the underlying container, (4) a high ultimate shrinkage (shrinkage at the highest temperature), e.g. 60% or greater shrinkage in the main shrinkage direction at 95° C., (5) low shrinkage in the direction orthogonal to the high shrinkage direction, (6) improved film toughness so as to prevent unnecessary fracturing, breaking, tearing, splitting, bubbling, or wrinkling of the film during manufacture and prior to and after shrinkage, and (7) recyclability.

Certain commercial films are made from polyester compositions that contain 1,4-cyclohexanedimethanol residues and ethylene glycol residues. Additional commercial needs exist for materials that have improved toughness. Fulfillment of this need in the art would allow for less expensive production, reduce lost manufacturing time due to film breakage, help to expand product portfolios, and allow for film downgauging to reduce the weight of film used in each label, and improved manufacturing efficiency by reducing downtime due to film breakage.

SUMMARY OF THE INVENTION

In view of the above commercial shortcomings in the art, the present disclosure addresses the need for properties in polyester compositions including one or more of the following desirable shrink film properties: (1) a low shrinkage activation temperature, (2) a shrinkage percentage which increases gradually and in a controlled manner with increasing temperature, (3) a shrink force low enough to prevent crushing of the underlying container, (4) a high ultimate shrinkage (shrinkage at the highest temperature), e.g. 60% or greater shrinkage in the main shrinkage direction at 95° C., (5) film toughness so as to prevent unnecessary fracturing, breaking, tearing, splitting, bubbling, webbing, or wrinkling of the film prior to and after shrinkage, and (6) recyclability.

The polyester compositions of the present disclosure will have utility, for example, in shrink films for the beverage and food packaging industry in the production of shrink labels and for other consumer products like automotive or household cleaners.

For the ease of reference but not intending to be limiting in any way, certain aspects of this disclosure are numbered consecutively, as follows.

In aspect 1 of this disclosure, a shrink film is provided comprising a polyester composition further comprising:
(1) at least one polyester which comprises:
   (a) a dicarboxylic acid component comprising:
      (i) about 70 to about 100 mole % of terephthalic acid residues;
      (ii) about 0 to about 30 mole % of aromatic and/or aliphatic dicarboxylic acid residues having up to 20 carbon atoms; and
   (b) a diol component comprising:
      (i) about 0.01 to about 30 mole % neopentyl glycol residues;
      (ii) about 0.01 to about less than 15 mole % 1,4-cyclohexanedimethanol residues;
      (iii) residues of diethylene glycol, whether or not formed in situ; and
      wherein the remainder of the diol component comprises:
      (iv) residues of ethylene glycol, and
      (v) optionally, 0 to 20 mole % or 0 to 10 mole % or 0 to 5 mole % of the residues of at least one modifying diol;
      wherein the total mole % of the dicarboxylic acid component is 100 mole %, and
      wherein the total mole % of the diol component is 100 mole %.

In aspect 2 of this disclosure, a shrink film is provided comprising a polyester composition further comprising:
(1) at least one polyester which comprises:
   (a) a dicarboxylic acid component comprising:
      (i) about 70 to about 100 mole % of terephthalic acid residues;
      (ii) about 0 to about 30 mole % of aromatic and/or aliphatic dicarboxylic acid residues having up to 20 carbon atoms; and
   (b) a diol component comprising:
      (i) about 0.01 to about 30 mole % neopentyl glycol residues;
      (ii) about 0.01 to about 12 mole % 1,4-cyclohexanedimethanol or about 0.01 to less than 12 mole % 1,4-cyclohexanedimethanol residues;
      (iii) residues of diethylene glycol, whether or not formed in situ; and
      wherein the remainder of the diol component comprises:
      (iv) residues of ethylene glycol, and
      (v) optionally, 0 to 20 mole % or 0 to 10 mole % or 0 to 5 mole % of the residues of at least one modifying diol;
      wherein the total mole % of the dicarboxylic acid component is 100 mole %, and
      wherein the total mole % of the diol component is 100 mole %.

In aspect 3 of this disclosure, a shrink film is provided comprising a polyester composition further comprising:
(1) at least one polyester which comprises:
   (a) a dicarboxylic acid component comprising:
      (i) about 70 to about 100 mole % of terephthalic acid residues;
      (ii) about 0 to about 30 mole % of aromatic and/or aliphatic dicarboxylic acid residues having up to 20 carbon atoms; and
   (b) a diol component comprising:
      (i) about 0.01 to about 30 mole % neopentyl glycol residues;
      (ii) about 0.01 to about 10 mole % 1,4-cyclohexanedimethanol residues;
      (iii) residues of diethylene glycol, whether or not formed in situ; and
      wherein the remainder of the diol component comprises:
      (iv) residues of ethylene glycol, and (v) optionally, 0 to 20 mole % or 0 to 10 mole % or 0 to 5 mole % of residues of at least one modifying diol;
wherein the remainder of the total diol component of the polyester comprises ethylene glycol residues;
wherein the total mole % of the dicarboxylic acid component is 100 mole %, and
wherein the total mole % of the diol component is 100 mole %.

In aspect 4 of this disclosure, a shrink film is provided comprising a polyester composition further comprising:
(1) at least one polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
    (i) about 0.01 to about 30 mole % neopentyl glycol residues;
    (ii) about 0.01 to less than 10 mole % 1,4-cyclohexanedimethanol residues; and
    (iii) residues of diethylene glycol, whether or not formed in situ;
    wherein the remainder of the diol component comprises:
    (iv) residues of ethylene glycol, and
    (v) optionally, 0 to 20 mole % or 0 to 10 mole % or 0 to 5 mole % of the residues of at least one modifying diol;
    wherein the total mole % of the dicarboxylic acid component is 100 mole %, and
    wherein the total mole % of the diol component is 100 mole %.

In aspect 5 of this disclosure, a shrink film is provided comprising a polyester composition further comprising:
(1) at least one polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
    (i) about 0.01 to about 30 mole % neopentyl glycol residues;
    (ii) about 2 to about 9 mole % 1,4-cyclohexanedimethanol residues; and
    (iii) residues of diethylene glycol, whether or not formed in situ;
    wherein the remainder of the diol component comprises:
    (iv) residues of ethylene glycol, and
    (v) optionally, 0 to 20 mole % or 0 to 10 mole % or 0 to 5 mole % of the residues of at least one modifying diol;
    wherein the total mole % of the dicarboxylic acid component is 100 mole %, and
    wherein the total mole % of the diol component is 100 mole %.

In aspect 6 of this disclosure, a shrink film is provided comprising a polyester composition further comprising:
(1) at least one polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
    (i) about 0.01 to about 30 mole % neopentyl glycol residues;
    (ii) about 3 to about 9 mole % 1,4-cyclohexanedimethanol residues; and
    (iii) residues of diethylene glycol, whether or not formed in situ;
    wherein the remainder of the diol component comprises:
    (iv) residues of ethylene glycol, and
    (v) optionally, 0 to 20 mole % of the residues or 0 to 10 mole % or 0 to 5 mole % of at least one modifying diol;
    wherein the total mole % of the dicarboxylic acid component is 100 mole %, and
    wherein the total mole % of the diol component is 100 mole %.

In aspect 7 of this disclosure, a shrink film is provided comprising a polyester composition further comprising:
(1) at least one polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
    (i) about 0.01 to about 30 mole % neopentyl glycol residues;
    (ii) about 0.01 to about less than 15 mole % 1,4-cyclohexanedimethanol residues;
    (iii) about 2 to about 12 mole %, or about 4 to about 12 mole %, or greater than 4 mole % to about 12 mole % of the residues of diethylene glycol, whether or not formed in situ;
    wherein the remainder of the diol component comprises:
    (iv) the residues of ethylene glycol, and
    (v) optionally, 0 to 20 mole % or 0 to 10 mole % or 0 to 5 mole % of the residues of at least one modifying diol;
    wherein the total mole % of the dicarboxylic acid component is 100 mole %, and wherein the total mole % of the diol component is 100 mole %.

In aspect 8 of this disclosure, a shrink film is provided comprising a polyester composition further comprising:
(1) at least one polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
    (i) about 0.01 to about 30 mole % neopentyl glycol residues;
    (ii) about 0.01 to about 12 mole % 1,4-cyclohexanedimethanol or about 0.01 to less than 12 mole % 1,4-cyclohexanedimethanol residues;
    (iii) about 2 to about 12 mole %, or about 4 to about 12 mole %, or greater than 4 mole % to about 12 mole % of the residues of diethylene glycol, whether or not formed in situ; and wherein the remainder of the diol component comprises:
(iv) the residues of ethylene glycol, and
(v) optionally, 0 to 20 mole % or 0 to 10 mole % or 0 to 5 mole % of the residues of at least one modifying diol;
wherein the total mole % of the dicarboxylic acid component is 100 mole %, and
wherein the total mole % of the diol component is 100 mole %.

In aspect 9 of this disclosure, a shrink film is provided comprising a polyester composition further comprising:
(1) at least one polyester which comprises:
(a) a dicarboxylic acid component comprising:
(i) about 70 to about 100 mole % of terephthalic acid residues;
(ii) about 0 to about 30 mole % of aromatic and/or aliphatic dicarboxylic acid residues having up to 20 carbon atoms; and
(b) a diol component comprising:
(i) about 0.01 to about 30 mole % neopentyl glycol residues;
(ii) about 0.01 to about 10 mole % 1,4-cyclohexanedimethanol residues;
(iii)) about 2 to about 12 mole %, or about 4 to about 12 mole %, or greater than 4 mole % to about 12 mole % of the residues of diethylene glycol, whether or not formed in situ; and wherein the remainder of the diol component comprises:
(iv) the residues of ethylene glycol, and
(v) optionally, 0 to 20 mole % or 0 to 10 mole % or 0 to 5 mole % of residues of at least one modifying diol;
wherein the remainder of the total diol component of the polyester comprises ethylene glycol residues;
wherein the total mole % of the dicarboxylic acid component is 100 mole %, and
wherein the total mole % of the diol component is 100 mole %.

In aspect 10 of this disclosure, a shrink film is provided comprising a polyester composition further comprising:
(1) at least one polyester which comprises:
(a) a dicarboxylic acid component comprising:
(i) about 70 to about 100 mole % of terephthalic acid residues;
(ii) about 0 to about 30 mole % of aromatic and/or aliphatic dicarboxylic acid residues having up to 20 carbon atoms; and
(b) a diol component comprising:
(i) about 0.01 to about 30 mole % neopentyl glycol residues;
(ii) about 0.01 to less than 10 mole % 1,4-cyclohexanedimethanol residues; and
(iii) about 2 to about 12 mole %, or about 4 to about 12 mole %, or greater than 4 mole % to about 12 mole % of the residues of diethylene glycol, whether or not formed in situ;
wherein the remainder of the diol component comprises:
(iv) residues of ethylene glycol, and
(v) optionally, 0 to 20 mole % or 0 to 10 mole % or 0 to 5 mole % of the residues of at least one modifying diol;
wherein the total mole % of the dicarboxylic acid component is 100 mole %, and
wherein the total mole % of the diol component is 100 mole %.

In aspect 11 of this disclosure, a shrink film is provided comprising a polyester composition further comprising:
(1) at least one polyester which comprises:
(a) a dicarboxylic acid component comprising:
(i) about 70 to about 100 mole % of terephthalic acid residues;
(ii) about 0 to about 30 mole % of aromatic and/or aliphatic dicarboxylic acid residues having up to 20 carbon atoms; and
(b) a diol component comprising:
(i) about 0.01 to about 30 mole % neopentyl glycol residues;
(ii) about 2 to about 9 mole % 1,4-cyclohexanedimethanol residues; and
(iii) residues of diethylene glycol, whether or not formed in situ;
wherein the remainder of the diol component comprises:
(iv) residues of ethylene glycol, and
(v) optionally, 0 to 20 mole % or 0 to 10 mole % or 0 to 5 mole % of the residues of at least one modifying diol;
wherein the total mole % of the dicarboxylic acid component is 100 mole %, and
wherein the total mole % of the diol component is 100 mole %.

In aspect 12 of this disclosure, a shrink film is provided comprising a polyester composition further comprising:
(1) at least one polyester which comprises:
(a) a dicarboxylic acid component comprising:
(i) about 70 to about 100 mole % of terephthalic acid residues;
(ii) about 0 to about 30 mole % of aromatic and/or aliphatic dicarboxylic acid residues having up to 20 carbon atoms; and
(b) a diol component comprising:
(i) about 0.01 to about 30 mole % neopentyl glycol residues;
(ii) about 3 to about 9 mole % 1,4-cyclohexanedimethanol residues; and
(iii) about 2 to about 12 mole %, or about 4 to about 12 mole %, or greater than 4 mole % to about 12 mole % of the residues of diethylene glycol, whether or not formed in situ;
wherein the remainder of the diol component comprises:
(iv) residues of ethylene glycol, and
(v) optionally, 0 to 20 mole % of the residues or 0 to 10 mole % or 0 to 5 mole % of at least one modifying diol;
wherein the total mole % of the dicarboxylic acid component is 100 mole %, and
wherein the total mole % of the diol component is 100 mole %.

In aspect 13 of this disclosure, a shrink film is provided comprising a polyester composition further comprising:
(1) at least one polyester which comprises:
(a) a dicarboxylic acid component comprising:
(i) about 70 to about 100 mole % of terephthalic acid residues;
(ii) about 0 to about 30 mole % of aromatic and/or aliphatic dicarboxylic acid residues having up to 20 carbon atoms; and
(b) a diol component comprising:
(i) about 5 mole % to about 30 mole %, or about 15 mole % to about 30 mole %, or about 15 mole % to about 25 mole % of neopentyl glycol residues;

(ii) about 0.01 to about less than 15 mole % 1,4-cyclohexanedimethanol residues;
(iii) about 2 to about 12 mole %, or about 4 to about 12 mole %, or greater than 4 mole % to about 12 mole % of the residues of diethylene glycol, whether or not formed in situ;
wherein the remainder of the diol component comprises:
(iv) the residues of ethylene glycol, and
(v) optionally, 0 to 20 mole % or 0 to 10 mole % or 0 to 5 mole % of the residues of at least one modifying diol;
wherein the total mole % of the dicarboxylic acid component is 100 mole %, and
wherein the total mole % of the diol component is 100 mole %.

In aspect 14 of this disclosure, a shrink film is provided comprising a polyester composition further comprising:
(1) at least one polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
    (i) about 5 mole % to about 30 mole %, or 15 mole % to 30 mole %, or 15 mole % to 25 mole % of neopentyl glycol residues;
    (ii) about 0.01 to about 12 mole % 1,4-cyclohexanedimethanol or about 0.01 to less than 12 mole % 1,4-cyclohexanedimethanol residues;
    (iii) about 2 to about 12 mole %, or about 4 to about 12 mole %, or greater than 4 mole % to about 12 mole % of the residues of diethylene glycol, whether or not formed in situ; and
  wherein the remainder of the diol component comprises:
    (iv) the residues of ethylene glycol, and
    (v) optionally, 0 to 20 mole % or 0 to 10 mole % or 0 to 5 mole % of the residues of at least one modifying diol;
  wherein the total mole % of the dicarboxylic acid component is 100 mole %, and
  wherein the total mole % of the diol component is 100 mole %.

In aspect 15 of this disclosure, a shrink film is provided comprising a polyester composition further comprising:
(1) at least one polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
    (i) about 5 mole % to about 30 mole %, or 15 mole % to 30 mole %, or 15 mole % to 25 mole % of neopentyl glycol residues;
    (ii) about 0.01 to about 10 mole % 1,4-cyclohexanedimethanol residues;
    (iii)) about 2 to about 12 mole %, or about 4 to about 12 mole %, or greater than 4 mole % to about 12 mole % of the residues of diethylene glycol, whether or not formed in situ; and
  wherein the remainder of the diol component comprises:
    (iv) the residues of ethylene glycol, and
    (v) optionally, 0 to 20 mole % or 0 to 10 mole % or 0 to 5 mole % of residues of at least one modifying diol;
  wherein the remainder of the total diol component of the polyester comprises ethylene glycol residues;
  wherein the total mole % of the dicarboxylic acid component is 100 mole %, and wherein the total mole % of the diol component is 100 mole %.

In aspect 16 of this disclosure, a shrink film is provided comprising a polyester composition further comprising:
(1) at least one polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
    about 5 mole % to about 30 mole %, or 15 mole % to 30 mole %, or 15 mole % to 25 mole % of neopentyl glycol residues;
    (ii) about 0.01 to less than 10 mole % 1,4-cyclohexanedimethanol residues; and
    (iii) about 2 to about 12 mole %, or about 4 to about 12 mole %, or greater than 4 mole % to about 12 mole % of the residues of diethylene glycol, whether or not formed in situ;
  wherein the remainder of the diol component comprises:
    (iv) residues of ethylene glycol, and
    (v) optionally, 0 to 20 mole % or 0 to 10 mole % or 0 to 5 mole % of the residues of at least one modifying diol;
wherein the total mole % of the dicarboxylic acid component is 100 mole %, and wherein the total mole % of the diol component is 100 mole %.

In aspect 17 of this disclosure, a shrink film is provided comprising a polyester composition further comprising:
(1) at least one polyester which comprises:
  (a) a dicarboxylic acid component comprising:
    (i) about 70 to about 100 mole % of terephthalic acid residues;
    (ii) about 0 to about 30 mole % of aromatic and/or aliphatic dicarboxylic acid residues having up to 20 carbon atoms; and
  (b) a diol component comprising:
    (i) about 5 mole % to about 30 mole %, or 15 mole % to 30 mole %, or 15 mole % to 25 mole % of neopentyl glycol residues;
    (ii) about 2 to about 9 mole % 1,4-cyclohexanedimethanol residues; and
    (iii) residues of diethylene glycol, whether or not formed in situ;
  wherein the remainder of the diol component comprises:
    (iv) residues of ethylene glycol, and
    (v) optionally, 0 to 20 mole % or 0 to 10 mole % or 0 to 5 mole % of the residues of at least one modifying diol;
  wherein the total mole % of the dicarboxylic acid component is 100 mole %, and
  wherein the total mole % of the diol component is 100 mole %.

In aspect 18 of this disclosure, a shrink film is provided comprising a polyester composition further comprising:
(1) at least one polyester which comprises:
   (a) a dicarboxylic acid component comprising:
      (i) about 70 to about 100 mole % of terephthalic acid residues;
      (ii) about 0 to about 30 mole % of aromatic and/or aliphatic dicarboxylic acid residues having up to 20 carbon atoms; and
   (b) a diol component comprising:
      (i) about 5 mole % to about 30 mole %, or 15 mole % to 30 mole %, or 15 mole % to 25 mole % of neopentyl glycol residues;
      (ii) about 3 to about 9 mole % 1,4-cyclohexanedimethanol residues; and
      (iii) about 2 to about 12 mole %, or about 4 to about 12 mole %, or greater than 4 mole % to about 12 mole % of the residues of diethylene glycol, whether or not formed in situ;
      wherein the remainder of the diol component comprises:
      (iv) residues of ethylene glycol, and
      (v) optionally, 0 to 20 mole % of the residues or 0 to 10 mole % or 0 to 5 mole % of at least one modifying diol;
      wherein the total mole % of the dicarboxylic acid component is 100 mole %, and
      wherein the total mole % of the diol component is 100 mole %.

Aspect 19 of this disclosure can include but is not limited to certain aspects such as aspects 1-18, a shrink film is provided comprising a polyester composition further comprising: 1,4-cyclohexanedimethanol residues are present in the amount of 0.01 to about 10 mole %, diethylene glycol residues are present in the amount of 2 to 15 mole % or 5 to 15 mole %, neopentyl glycol residues in the amount of 5 to 30 mole %, and the ethylene glycol residues are present in the amount of 50 mole % or greater, wherein the total mole % of the dial component is 100 mole %.

In aspect 20 of this disclosure, a shrink film is provided comprising a polyester composition further comprising:
(1) at least one polyester which comprises:
   (a) a dicarboxylic acid component comprising:
      (i) about 70 to about 100 mole % of terephthalic acid residues;
      (ii) about 0 to about 30 mole % of aromatic and/or aliphatic dicarboxylic acid residues having up to 20 carbon atoms; and
   (b) a diol component comprising:
      (i) about 12 mole % to about 30 mole % of neopentyl glycol residues;
      (ii) about 3 to about 23 mole % 1,4-cyclohexanedimethanol residues; and
      (iii) about 3 to about 12 mole %, of the residues of diethylene glycol, whether or not formed in situ;
      wherein the remainder of the diol component comprises:
      (iv) residues of ethylene glycol, and
      (v) optionally, 0 to 20 mole % of the residues or 0 to 10 mole % or 0 to 5 mole % of at least one modifying diol;
      wherein the total mole % of the dicarboxylic acid component is 100 mole %, and wherein the total mole % of the diol component is 100 mole %.

In aspect 21 of this disclosure, a shrink film is provided comprising a polyester composition further comprising:
(1) at least one polyester which comprises:
   (a) a dicarboxylic acid component comprising:
      (i) about 70 to about 100 mole % of terephthalic acid residues;
      (ii) about 0 to about 30 mole % of aromatic and/or aliphatic dicarboxylic acid residues having up to 20 carbon atoms; and
   (b) a diol component comprising:
      (i) about 15 mole % to about 30 mole % of neopentyl glycol residues;
      (ii) about 3 to about 10 mole % 1,4cyclohexanedimethanol residues; and
      (iii) about 3 to about 10 mole % of the residues of diethylene glycol, whether or not formed in situ;
      wherein the remainder of the diol component comprises:
      (iv) residues of ethylene glycol, and
      (v) optionally, 0 to 20 mole % of the residues or 0 to 10 mole % or 0 to 5 mole % of at least one modifying diol;
      wherein the total mole % of the dicarboxylic acid component is 100 mole %, and
      wherein the total mole % of the diol component is 100 mole %.

In aspect 22 of this disclosure, a shrink film is provided comprising a polyester composition further comprising:
(1) at least one polyester which comprises:
   (a) a dicarboxylic acid component comprising:
      (i) about 70 to about 100 mole % of terephthalic acid residues;
      (ii) about 0 to about 30 mole % of aromatic and/or aliphatic dicarboxylic acid residues having up to 20 carbon atoms; and
   (b) a diol component comprising:
      (i) about 20 mole % to about 30 mole % of neopentyl glycol residues;
      (ii) about 3 to about 8 mole % 1,4cyclohexanedimethanol residues; and
      (iii) about 5 to about 10 mole % of the residues of diethylene glycol, whether or not formed in situ;
      wherein the remainder of the diol component comprises:
      (iv) residues of ethylene glycol, and
      (v) optionally, 0 to 20 mole % of the residues or 0 to 10 mole % or 0 to 5 mole % of at least one modifying diol;
      wherein the total mole % of the dicarboxylic acid component is 100 mole %, and
      wherein the total mole % of the diol component is 100 mole %.

In aspect 23 of this disclosure, a shrink film is provided comprising a polyester composition further comprising:
(1) at least one polyester which comprises:
   (a) a dicarboxylic acid component comprising:
      (i) about 70 to about 100 mole % of terephthalic acid residues;
      (ii) about 0 to about 30 mole % of aromatic and/or aliphatic dicarboxylic acid residues having up to 20 carbon atoms; and
   (b) a diol component comprising:
      (i) about 23 mole % to about 27 mole % of neopentyl glycol residues;
      (ii) about 4 to about 6 mole % 1,4cyclohexanedimethanol residues; and (iii) about 6 to about 8 mole % of the residues of diethylene glycol, whether or not formed in situ; wherein the remainder of the diol component comprises:
(iv) residues of ethylene glycol, and
(v) optionally, 0 to 20 mole % of the residues or 0 to 10 mole % or 0 to 5 mole % of at least one modifying diol;
wherein the total mole % of the dicarboxylic acid component is 100 mole %, and
wherein the total mole % of the diol component is 100 mole %.

In aspect 24 of this disclosure, which can include but is not limited to aspects 1-23, a shrink film is provided comprising a polyester composition further comprising: 1,4-cyclohexanedimethanol residues in the amount of 0.01 to about 5 mole %, diethylene glycol residues in the amount of 5 to 15 mole % neopentyl glycol residues in the amount of 15 to 30 mole %, and ethylene glycol residues in the amount of 50 mole % or greater, wherein the total mole % of the dial component is 100 mole %.

In aspect 25 of this disclosure, which can include but is not limited to aspects 1-24, a shrink film is provided comprising a polyester composition further comprising: 1,4-cyclohexanedimethanol residues in the amount of 2 to 7 mole %, diethylene glycol residues in the amount of of from 4 to 15 mole %, neopentyl glycol residues in the amount of 10 to 30 mole %, and ethylene glycol residues in the amount of greater than 50 mole % or greater, wherein the total mole % of the diol component is 100 mole %.

In aspect 26 of this disclosure, which can include but is not limited to aspects 1-25, a shrink film is provided comprising a polyester composition further comprising: 1,4-cyclohexanedimethanol residues in the amount of less than 10 mole %, diethylene glycol residues in the amount of from 4 to 15 mole %, neopentyl glycol residues in the amount of greater than 10 mole %, and ethylene glycol residues in the amount of 60 mole % or greater, wherein the total mole % of the diol component is 100 mole %.

In aspect 27 of this disclosure, which can include but is not limited to aspects 1-26, the sum of one or more diol monomer components capable of forming an amorphous component in the final polyester composition is from 20 to 45 mole %, or from 25 to 45 mole %, or from 25 to 40 mole %, wherein the total mole % of the did component is 100 mole %.

In aspect 28 of this disclosure, which can include but is not limited to aspects 1-27, the sum of the residues of 1,4-cyclohexanedimethanol and residues of neopentyl glycol in the final polyester composition can be from 12 to 31 mole %, or from 15 to 31 mole %, wherein the total mole % of the did component is 100 mole %.

In aspect 29 of this disclosure; which can include but is not limited aspects 1-28, the polyester useful in this disclosure can have a Tg of 60 to 80° C.; or 65 to 80° C.; or 65 to 75° C.; as determined using a TA DSC 2920 from Thermal Analyst Instrument at a scan rate of 20° C./min. Any other embodiment described herein can also have these Tg ranges if the polyester composition can attain this Tg range, with or without the use of additives such as plasticizers.

In aspect 30 of this disclosure, which can include but is not limited to aspects 1-29, at least one modifying did can be butanediol. In one embodiment, the butanediol can be present at less than 10 mole % or less than 4 mole %.

In aspect 31 of this disclosure, which can include but is not limited to aspects 1-30, butanediol can be excluded from the scope of this disclosure.

In aspect 32 of this disclosure, which can include but is not limited to aspects 1-31, any of the polyester compositions described herein can be used to make molded articles, whether or not described herein in connection with shrink film.

In aspect 33 of this disclosure, which can include but is not limited to aspects 1-32, the amount of residues of diethylene glycol in the final polyester can be any amount but in some aspects can be less than 4 mole %, or less than 2.5 mole %, In aspect 34 of this disclosure, which can include but is not limited to aspects 1-33, as well other embodiments of the disclosure, the shrink films of the present disclosure can have shrinkage in the direction orthogonal to the main shrinkage direction from 4% or less, or 2.5% or less, or 2% or less, or no shrinkage when immersed in water at 65° C. for 10 seconds. In this aspect 34, the shrink films of this disclosure can have shrinkage in the direction orthogonal to the main shrinkage direction of from −5% to 4%, or −5% to 2.5%, or −5% to 2%, or −4% to 4%, or −3% to 4% or −2% to 4%, or −2% to 2.5%, or −2% to 2%, or 0 to 2%, or no shrinkage, when immersed in water at 65° C. for 10 seconds.

In aspect 35 of this disclosure, which can include but is not limited to aspect 1-34 and can be applicable to other embodiments of this disclosure, the shrink films of this disclosure have shrinkage in the main shrinkage direction of from 50% or greater, or 70% or greater, when immersed in water at 85° C. for 10 seconds.

In aspect 36 of this disclosure, which can include but is not limited to aspect 1-34 and can be applicable to other embodiments of this disclosure, the shrink films of the disclosure have shrinkage in the main shrinkage direction in the amount of 50 to 90% and shrinkage in the direction orthogonal to the main shrinkage direction of 4% or less, or from −5% to 4%, when immersed in water at 95° C. for 10 seconds.

In aspect 37 of this disclosure, which can include but is not limited to aspects 1-36, the polyesters useful in the present disclosure are made into films using any method known in the art to produce films from polyesters, (e.g. solution casting, extrusion, compression molding, or calendering). The as extruded (or as formed) film is then oriented in one or more directions (e.g., monoaxially and/or biaxially oriented film). This orientation of the films can be performed by any method known in the art using standard orientation conditions. For example, the monoaxially oriented films of the present disclosure can be made from films having a thickness of about 100 to 400 microns, such as, extruded, cast or calendered films, which can be stretched at a ratio of 6.5:1 to 3:1 at a temperature of from the Tg of the film to the Tg+55 deg C., and which can be stretched to a thickness of 20 to 80 microns. In one embodiment, the orientation of the initial as extruded film can be performed on a tenter frame according to these orientation conditions.

In aspect 38 of this disclosure, which can include but is not limited to aspects 1-37 and can be applicable to other embodiments of this disclosure, the shrink films of the present disclosure have no more than 40% shrinkage in the transverse direction per 5° C. temperature increase increment.

In aspect 39 of this disclosure, which can include but is not limited to aspects 1-38 and can be applicable to other embodiments of this disclosure, the shrink films of the present disclosure can have a shrink initiation temperature of from about 55 to about 80° C., or about 55 to about 75° C., or 55 to about 70° C. Shrink initiation temperature is the temperature at which onset of shrinkage occurs.

In aspect 40 of this disclosure, which can include but is not limited to aspects 1-39 and can be applicable to other embodiments of this disclosure, the shrink films of the present disclosure can have a shrink initiation temperature of between 55° C. and 70° C.

In aspect 41 of this disclosure, which can include but is not limited to aspects 1-40 and can be applicable to other embodiments of this disclosure as well, the shrink films of the present disclosure can have a break strain percentage greater than 200% at a stretching speed of 500 mm/minute in the direction orthogonal to the main shrinkage direction according to ASTM Method D882.

In aspect 42 of this disclosure, which can include but is not limited to aspects 1-41 and can be applicable to other embodiments of this disclosure as well, the shrink films of the present disclosure can have a break strain percentage of greater than 300% at a stretching speed of 500 mm/minute in the direction orthogonal to the main shrinkage direction according to ASTM Method D882.

In aspect 43 of this disclosure, which can include but is not limited to aspects 1-42 and can be applicable to other embodiments of this disclosure, the shrink films of the present disclosure can have a tensile stress at break (break stress) of from 20 to 400 MPa; or 40 to 260 MPa; or 42 to 260 MPa as measured according to ASTM Method D882.

In aspect 44 of this disclosure, which can include but is not limited to aspects 1-43 and can be applicable to other embodiments of this disclosure, the shrink films of the present disclosure can have a shrink force of from 4 to 18 MPa, or from 4 to 15 MPa, or from 6 to 15 MPa, as measured by ISO Method 14616 depending on the stretching conditions and the end-use application desired. For example, certain labels made for plastic bottles can have an MPa of from 4 to 8 and certain labels made for glass bottles can have a shrink force of from 10 to 14 Mpa as measured by ISO Method 14616 using a Shrink Force Tester made by Lab-Think @ 80° C.

In one aspect of this disclosure, the polyester compositions can be formed by reacting the monomers by known methods for making polyesters in what is typically referred to as reactor grade compositions.

In one aspect of this disclosure, the polyester compositions can be formed by blending polyesters.

Unexpectedly, the polyesters useful in this invention have a good combination of properties, for example, toughness, shrink force, and shrink initiation temperature and as otherwise described herein when the described compositional ranges are present and minimal CHDM is used to achieve these properties.

DETAILED DESCRIPTION

The present disclosure may be understood more readily by reference to the following detailed description of certain embodiments of this disclosure and the working examples. In accordance with the purpose(s) of this disclosure, certain embodiments of this disclosure are described in the Summary of the Invention and are further described herein below. Also, other embodiments of the present disclosure are described herein.

It is believed that certain shrink films comprising polyesters and/or polyester composition(s) useful in the present disclosure formed from residues of terephthalic acid, an ester thereof, and/or mixtures thereof, and residues of ethylene glycol, 1,4-cyclohexanedimethanol, neopentyl glycol, and diethylene glycol (where the diethylene glycol can be formed in situ or can be added or both) have a unique combination of two or more of the following properties: certain glass transition temperature (Tg), certain flexural modulus, good clarity, good color, toughness, controlled shrinkage and low shrink force.

It is believed that certain shrink films comprising polyesters and/or polyester composition(s) useful in this disclosure can have certain properties including those above and/or at least one of the following desirable shrink film properties: (1) a low onset of shrinkage temperature, (2) a shrinkage percentage which increases gradually and in a controlled manner with increasing temperature over the temperature range where shrinkage occurs, (3) a shrink force low enough to prevent crushing of the underlying container, (4) a high ultimate shrinkage (shrinkage at the highest temperature) e.g., 60% or greater in the main shrinkage direction at 95° C., (5) low shrinkage in the direction orthogonal to the main shrinkage direction, (6) film toughness so as to prevent unnecessary fracturing, breaking, tearing, splitting, bubbling, or wrinkling of the film during manufacture or prior to and after shrinkage, and (7) recyclability.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds, for example, branching agents. Typically, the difunctional carboxylic acid can be a dicarboxylic acid and the difunctional hydroxyl compound can be a dihydric alcohol, for example, glycols and diols. The term "glycol" as used herein includes, but is not limited to, diols, glycols, and/or multifunctional hydroxyl compounds, for example, branching agents. Alternatively, the difunctional carboxylic acid may be a hydroxy carboxylic acid, for example, p-hydroxybenzoic acid, and the difunctional hydroxyl compound may have an aromatic nucleus bearing 2 hydroxyl substituents, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through an ester group. Thus, for example, the dicarboxylic acid residues may be derived from a dicarboxylic acid monomer or its associated acid halides, esters, salts, anhydrides, and/or mixtures thereof. Furthermore, as used herein, the term "diacid" includes multifunctional acids, for example, branching agents. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, and/or mixtures thereof, useful in a reaction process with a diol to make a polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, and/or mixtures thereof or residues thereof useful in a reaction process with a diol to make a polyester.

The polyesters used in the present disclosure typically can be prepared from dicarboxylic acids and diols which react in substantially equal proportions and are incorporated into the polyester polymer as their corresponding residues. The polyesters of the present disclosure, therefore, can contain substantially equal molar proportions of acid residues (100 mole %) and diol (and/or multifunctional hydroxyl compound) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 10 mole % isophthalic acid, based on the total acid residues, means the polyester contains 10 mole % isophthalic acid residues out of a total of 100 mole % acid residues. Thus, there are 10 moles of isophthalic acid residues among every 100 moles of acid residues. In another example, a polyester containing 25 mole % 1,4-cyclohexanedimethanol, based on the total diol residues, means the polyester contains 25 mole % 1,4-cyclohexanedimethanol residues out of a total of 100 mole % diol residues. Thus, there are 25 moles of 1,4-cyclohexanedimethanol residues among every 100 moles of diol residues.

In certain embodiments, terephthalic acid or an ester thereof, for example, dimethyl terephthalate or a mixture of terephthalic acid residues and an ester thereof can make up a portion or all of the dicarboxylic acid component used to form the polyesters useful in the present disclosure. In certain embodiments, terephthalic acid residues can make up a portion or all of the dicarboxylic acid component used to form the polyesters useful in this disclosure. For the purposes of this disclosure, the terms "terephthalic acid" and "dimethyl terephthalate" are used interchangeably herein. In one embodiment, dimethyl terephthalate is part or all of the dicarboxylic acid component used to make the polyesters useful in the present disclosure. In embodiments, ranges of from 70 to 100 mole %; or 80 to 100 mole %; or 90 to 100 mole %; or 99 to 100 mole %; or 100 mole % terephthalic acid and/or dimethyl terephthalate and/or mixtures thereof may be used.

In addition to terephthalic acid, the dicarboxylic acid component of the polyesters useful in the present disclosure can comprise up to 30 mole %, up to 20 mole %, up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, 0.01 to 10 mole %, from 0.01 to 5 mole % and from 0.01 to 1 mole %, In one embodiment, modifying aromatic dicarboxylic acids that may be used in the present disclosure include but are not limited to those having up to 20 carbon atoms, and which can be linear, para-oriented, or symmetrical. Examples of modifying aromatic dicarboxylic acids which may be used in this disclosure include, but are not limited to, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. In one embodiment, the modifying aromatic dicarboxylic acid is isophthalic acid.

The carboxylic acid component of the polyesters useful in the present disclosure can be further modified with up to 10 mole %, such as up to 5 mole % or up to 1 mole % of one or more aliphatic dicarboxylic acids containing 2-16 carbon atoms, for example, cyclohexanedicarboxylic, malonic, succinic, glutaric, adipic, pimelic, suberic, azelaic and/or dodecanedioic dicarboxylic acids. Certain embodiments can also comprise 0.01 to 10 mole %, such as 0.1 to 10 mole %, 1 or 10 mole %, 5 to 10 mole % of one or more modifying aliphatic dicarboxylic acids. Yet another embodiment contains 0 mole % modifying aliphatic dicarboxylic acids. The total mole % of the dicarboxylic acid component is 100 mole %. In one embodiment, adipic acid and/or glutaric acid are provided in the modifying aliphatic dicarboxylic acid component of the polyesters and are useful in the present disclosure.

Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

In one embodiment, the diol component of the polyester compositions useful in the present disclosure can comprise 1,4-cyclohexanedimethanol. In another embodiment, the diol component of the polyester compositions useful in the present disclosure comprise 1,4-cyclohexanedimethanol and 1,3-cyclohexanedimethanol. The molar ratio of cis/trans 1,4-cyclohexandimethanol can vary within the range of 50/50 to 0/100, for example, between 40/60 to 20/80.

The diol component of the polyester compositions useful in the present disclosure can include, but is not limited to, compositions wherein the sum of the residues of 1,4-cyclohexanedimethanol and residues of neopentyl glycol in the final polyester composition is from 10 to 40 mole %, or from 20 to 40 mole %, 10 to 35 mole %, or from 11 to 35 mole %, or from 12 to 35 mole %, or from 13 to 35 mole %, or from 14 to 35 mole %, or from 15 to 35 mole %, or from 10 to 34 mole %, or from 11 to 34 mole %, or from 12 to 34 mole %, or from 13 to 34 mole %, or from 14 to 34 mole %, or from 15 to 34 mole %, or from 10 to 33 mole %, or from 11 to 33 mole %, or from 12 to 33 mole %, or from 13 to 33 mole %, or from 14 to 33 mole %, or from 15 to 33 mole %, or from 10 to 32 mole %, or from 11 to 32 mole %, or from 12 to 32 mole %, or from 13 to 32 mole %, or from 14 to 32 mole %, or from 15 to 32 mole %, or from 10 to 31 mole %, or from 11 to 31 mole %, or from 12 to 31 mole %, or from 13 to 31 mole %, or from 14 to 31 mole %, or from 15 to 31 mole %, or from 10 to 30 mole %, or from 11 to 30 mole %, or from 12 to 30 mole %, or from 13 to 30 mole %, or from 14 to 30 mole %, or from 15 to 30 mole %, or from 10 to 29 mole %, or from 11 to 29 mole %, or from 12 to 29 mole %, or from 13 to 29 mole %, or from 14 to 29 mole %, or from 15 to 29 mole %, or from 10 to 28 mole %, or from 11 to 28 mole %, or from 12 to 28 mole %, or from 13 to 28 mole %, or from 14 to 28 mole %, or from 15 to 28 mole %. In one embodiment, the sum of residues of 1,4-cyclohexanedimethanol and residues of neopentyl glycol in the final polyester composition can be from 12 to 31 mole %, or from 15 to 31 mole %, or from 15 to 28 mole %, or from 15 to 25 mole %, or from 15 to 30 mole %, or from 15 to 35 mole %, or from 20 to 35 mole %, wherein the total mole % of the diol component is 100 mole %.

In one embodiment, the diol component of the polyester compositions useful in this disclosure can contain 0 to 30 mole % of neopentyl glycol based on the total mole % of the diol component being 100 mole %. In one embodiment, the diol component of the polyester compositions useful in this disclosure can contain 5 to 30 mole % of neopentyl glycol based on the total mole % of the diol component being 100 mole %. In one embodiment, the diol component of the polyester compositions useful in this disclosure can contain 5 to 25 mole % of neopentyl glycol based on the total mole % of the diol component being 100 mole %. In one embodiment, the diol component of the polyester compositions useful in this disclosure can contain 10 to 30 mole % of neopentyl glycol based on the total mole % of the diol component being 100 mole %. In one embodiment, the diol component of the polyester compositions useful in this disclosure can contain 10 to 25 mole % of neopentyl glycol based on the total mole % fo the diol component being 100 mole %. In one embodiment, the diol component of the polyester compositions useful in this disclosure can contain 15 to 30 mole % of neopentyl glycol based on the total mole % of the diol component being 100 mole %. In one embodiment, the dial component of the polyester compositions useful in this disclosure can contain 15 to 25 mole % of neopentyl glycol based on the total mole % of the diol component being 100 mole %.

In one embodiment, the diol component of the polyester compositions useful in the present disclosure can contain from 0.01 to 15 mole %, or from 0.01 to 14 mole %, or from 0.01 to 13 mole %, or from 0.01 to 12 mole %, or from 0.01 to 11 mole %, or 0.01 to 10 mole %, or from 0.01 to 9 mole %, or from 0.01 to 8 mole %, or from 0.01 to 7 mole %, or from 0.01 to 6 mole %, or from 0.01 to 5 mole %, 3 to 15 mole %, or from 3 to 14 mole %, or from 3 to 13 mole %, or from 3 to 12 mole %, or from 3 to 11 mole %, or 3 to 10 mole %, or from 3 to 9 mole %, or from 3 to 8 mole %, or from 3 to 7 mole %, of 1,4-cyclohexanedimethanol residues, based on the total mole % of the diol component being 100 mole %.

In one embodiment, the diol component of the polyester compositions useful in the present disclosure can contain 0.01 to 15 mole % of 1,4-cyclohexanedimethanol based on the total mole % of the diol component being 100 mole %, In one embodiment, the dial component of the polyester compositions useful in this disclosure can contain 0.01 to less than 15 mole % of 1,4-cyclohexanedimethanol based on the total mole % of the diol component being 100 mole %. In one embodiment, the diol component of the polyester compositions useful in this disclosure can contain 0.01 to 10 mole % of 1,4-cyclohexanedimethanol based on the total mole % of the dial component being 100 mole %. In one embodiment, the diol component of the polyester compositions useful in this disclosure can contain 0.01 to less than 10 mole % of 1,4-cyclohexanedimethanol based on the total mole % of the diol component being 100 mole %. In one embodiment, the diol component of the polyester compositions useful in this disclosure can contain 0.01 to 5 mole % of 1,4-cyclohexanedimethanol based on the total mole % of the dial component being 100 mole %. In one embodiment, the diol component of the polyester compositions useful in this disclosure can contain 0.01 to less than 5 mole % of 1,4-cyclohexanedimethanol based on the total mole % of the diol component being 100 mole %.

In one embodiment, the diol component of the polyester compositions useful in the present disclosure can contain 0.01 to 15 mole % of 1,4-cyclohexanedimethanol based on the total mole % of the diol component being 100 mole %. In one embodiment, the diol component of the polyester compositions useful in this disclosure can contain 0.01 to less than 15 mole % of 1,4-cyclohexanedimethanol based on the total mole % of the diol component being 100 mole %, In one embodiment, the diol component of the polyester compositions useful in this disclosure can contain 0.01 to 10 mole % of 1,4-cyclohexanedimethanol based on the total mole % of the diol component being 100 mole %. In one embodiment, the diol component of the polyester compositions useful in this disclosure can contain 0.01 to less than 10 mole % of 1,4-cyclohexanedimethanol based on the total mole % of the diol component being 100 mole %. In one embodiment, the diol component of the polyester compositions useful in this disclosure can contain 0.01 to 5 mole % of 1,4-cyclohexanedimethanol based on the total mole % of the diol component being 100 mole %. In one embodiment, the diol component of the polyester compositions useful in this disclosure can contain 0.01 to less than 5 mole % of 1,4-cyclohexanedimethanol based on the total mole % of the diol component being 100 mole %.

It should be understood that some other diol residues may be formed in situ during processing. The total amount of diethylene glycol residues can be present in the polyester useful in the present disclosure, whether or not formed in situ during processing or intentionally added, or both, in any amount, for example, from 2 to 12 mole %, or from 2 to 11 mole %, or 2 to 10 mole %, or from 2 to 9 mole %, or from 3 to 12 mole %, or from 3 to 11 mole %, or 3 to 10 mole %, or from 3 to 9 mole %, or from 4 to 12 mole %, or from 4 to 11 mole %, or 4 to 10 mole %, or from 4 to 9 mole %, or, from 5 to 12 mole %, or from 5 to 11 mole %, or 5 to 10 mole %, or from 5 to 9 mole %, of diethylene glycol residues, based on the total mole % of the diol component being 100 mole %.

In one embodiment for molded articles, the polyester portion of the polyester compositions useful in the present disclosure can contain from 4 mole % or less, or from 3.5 mole % or less, or from 3.0 mole % or less, or from 2.5 mole % or less, or from 2.0 mole % or less, or from 1.5 mole % or less, or from 1.0 mole % or less, or from 1 to 4 mole %, or from 1 to 3 mole %, or from 1 to 2 mole % of diethylene glycol residues, or or from 2 to 8 mole %, or from 2 to 7 mole %, or from 2 to 6 mole %, or from 2 to 5 mole %, or from 3 to 8 mole %, or from 3 to 7 mole %, or from 3 to 6 mole %, or from 3 to 5 mole %, or no intentionally added diethylene glycol residues, based on the total mole % of the dial component being 100 mole %. In certain embodiments, the polyester contains no added modifying diols.

For all embodiments, the remainder of the diol component can comprise ethylene glycol residues in any amount based on the total mole % of the diol component being 100 mole %. In one embodiment, the polyester portion of the polyester compositions useful in the present disclosure can contain 50 mole % or greater, or 55 mole % or greater, or 60 mole % or greater, or 65 mole % or greater, or from 50 to 80 mole %, or from 55 to 80 mole %, or from 60 to 80 mole %, or from 50 to 75 mole %, or from 55 to 75 mole %, or from 60 to 75 mole %, or from 65 to 75 mole % of ethylene glycol residues, based on the total mole % of the diol component being 100 mole %.

In one embodiment, the diol component of the polyester compositions useful in the present disclosure can contain up to 20 mole %, or up to 19 mole %, or up to 18 mole %, or up to 17 mole %, or up to 16 mole %, or up to 15 mole %, or up to 14 mole %, or up to 13 mole %, or up to 12 mole %, or up to 11 mole %, or up to 10 mole %, or up to 9 mole %, or up to 8 mole %, or up to 7 mole %, or up to 6 mole %, or up to 5 mole %, or up to 4 mole %, or up to 3 mole %, or up to 2 mole %, or up to 1 mole %, or less of one or more modifying diols (modifying diols are defined as diols which are not ethylene glycol, diethylene glycol, neopentyl glycol, or 1,4-cyclohexanedimethanol). In certain embodiments, the polyesters useful in this disclosure can contain 10 mole % or less of one or more modifying diols. In certain embodiments, the polyesters useful in this disclosure can contain 5 mole % or less of one or more modifying diols. In certain embodiments, the polyesters useful in this disclosure can contain 3 mole % or less of one or more modifying diols. In another embodiment, the polyesters useful in this disclosure can contain 0 mole % modifying diols. It is contemplated, however, that some other diol residuals may form in situ so that residual amounts formed in situ are also an embodiment of this disclosure.

In embodiments, modifying diols for use in the polyesters, if used, as defined herein contain 2 to 16 carbon atoms. Examples of modifying dials include, but are not limited to, 1,2-propanediol, 1,3-propanediol, isosorbide, 1,4-butanediol, 1,5-pentanedial, 1,6-hexanediol, p-xylene glycol, polytetramethylene glycol, 2,2,4,4-tetramethyl-1,3-cyclobutanediol (TMCD) and mixtures thereof. In one embodiment, isosorbide is a modifying diol. In another embodiment, the modifying diols include, but are not limited to, at least one of 1,3-propanediol and 1,4-butanediol. In one embodiment, 1,3-propanediol and/or 1,4-butanedial can be excluded. If 1,4- or 1,3-butanediol are used, greater than 4 mole % or greater than 5 mole % can be provided in one embodiment. In one embodiment, at least one modifying diol is 1,4-butanediol which present in the amount of 5 to 25 mole %.

In one embodiment, a shrink film is provided comprising a polyester composition further comprising: 1,4-cyclohexanedimethanol residues are present in the amount of 0.01 to about 10 mole %, diethylene glycol residues are present in the amount of 2 to 9 mole %, neopentyl glycol residues in the amount of 5 to 30 mole %, and ethylene glycol residues are present in the amount of 60 mole % or greater, based on the total mole % of the diol component being 100 mole %.

In one embodiment, a shrink film is provided comprising a polyester composition further comprising: 1,4-cyclohexanedimethanol residues are present in the amount of 0.01 to about 5 mole %, diethylene glycol residues are present in the amount of 5 to 9 mole %, neopentyl glycol residues in the amount of 15 to 25 mole %, and ethylene glycol residues are present in the amount of 60 mole % or greater, based on the total mole % of the diol component being 100 mole %.

In one embodiment, a shrink film is provided comprising a polyester composition further comprising: 1,4-cyclohexanedimethanol residues are present in the amount of 2 to 7 mole %, diethylene glycol residues are present in the amount of less than 10 mole %, neopentyl glycol residues in the amount of 10 to 25 mole %, and ethylene glycol residues are present in the amount of greater than 60 mole %, based on the total mole % of the diol component being 100 mole %.

In one embodiment, a shrink film is provided comprising a polyester composition further comprising: 1,4-cyclohexanedimethanol residues are present in the amount of less than 10 mole %, diethylene glycol residues are present in the amount of from 5 to 10 mole %, neopentyl glycol residues in the amount of greater than 10 mole %, and ethylene glycol residues are present in the amount of 60 mole % or greater, based on the total mole % of the diol component being 100 mole %.

In one embodiment, a shrink film is provided wherein the sum of one or more diol monomer components capable of forming an amorphous component in the final polyester composition is from 20 to 45 mole %, or from 22 to 45 mole %, or from 20 to 40 mole %, or from 24 to 40 mole %, or from 30 to 45 mole %, or 25 to 45 mole %, or from 25 to 40 mole % or from 25 to 35 mole %, wherein the total mole % of the diol component content is 100 mole %.

In one embodiment, a shrink film is provided wherein the sum of the residues of 1,4-cyclohexanedimethanol and residues of neopentyl glycol in the final polyester composition is from 12 to 35 mole %, or from 15 to 40 mole %, or from 15 to 35 mole %, or from 20 to 40 mole %, or from 25 to 40 mole %, or from 20 to 45 mole %, or from 25 to 35 mole %, wherein the total mole % of the diol component is 100 mole %.

In some embodiments, the polyesters according to the present disclosure can comprise from 0 to 10 mole %, for example, from 0.01 to 5 mole %, from 0.01 to 1 mole %, from 0.05 to 5 mole %, from 0.05 to 1 mole %, or from 0.1 to 0.7 mole %, based the total mole percentages of either the diol or diacid residues; respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polyester. In some embodiments, the polyester(s) useful in the present disclosure can thus be linear or branched.

Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole % of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the polyester reaction mixture or blended with the polyester in the form of a concentrate as described, for example, in U.S. Pat. Nos. 5,654,347 and 5,696,176, whose disclosure regarding branching monomers is incorporated herein by reference.

The polyesters useful in the present disclosure can comprise at least one chain extender. Suitable chain extenders include, but are not limited to, multifunctional (including, but not limited to, bifunctional) isocyanates, multifunctional epoxides, including, for example, epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion.

The amount of chain extender used can vary depending on the specific monomer composition used and the physical properties desired but is generally about 0.1 percent by weight to about 10 percent by weight, such as about 0.1 to about 5 percent by weight, based on the total weight of the polyester.

It is contemplated that polyester compositions useful in the present disclosure can possess at least one of the inherent viscosity ranges described herein and at least one of the monomer ranges for the polyester compositions described herein, unless otherwise stated. It is also contemplated that polyester compositions useful in the present disclosure can possess at least one of the Tg ranges described herein and at least one of the monomer ranges for the polyester compositions described herein, unless otherwise stated. It is also contemplated that polyester compositions useful in the present disclosure can possess at least one of the inherent viscosity ranges described herein, at least one of the Tg ranges described herein, and at least one of the monomer ranges for the polyester compositions described herein, unless otherwise stated.

For embodiments of the invention, the polyesters useful in the invention can exhibit at least one of the following inherent viscosities as determined in 60/40 (wt/wt) phenol/ tetrachloroethane at a concentration of 0.25 g/50 ml at 25° C.: 0.50 to 1.2 dL/g; 0.50 to 1.0 dL/g; 0.50 to 0.90 dL/g; 0.50 to 0.80 dL/g; 0.55 to 0.80 dL/g; 0.60 to 0.80 dL/g; 0.65 to 0.80 dL/g; 0.70 to 0.80 dL/g; 0.50 to 0.75 dL/g; 0.55 to 0.75 dL/g; or 0.60 to 0.75 dL/g.

The glass transition temperature (Tg) of the polyesters is determined using a TA DSC 2920 from Thermal Analyst Instrument at a scan rate of 20° C./min.

In certain embodiments, the oriented films or shrink films of the invention comprise polyesters/polyester compositions wherein the polyester has a Tg of 60 to 80° C.; 70 to 80° C.; or 65 to 80° C.; or 65 to 75° C. In certain embodiments, these Tg ranges can be met with or without at least one plasticizer being added during polymerization.

In embodiments of the present disclosure, certain oriented films and/or shrinkable films comprising the polyesters and/or polyester compositions useful in this disclosure can have a unique combination of all of the following properties: good stretchability, controlled shrinkage properties, certain toughness, certain inherent viscosities, certain glass transition temperatures (Tg), certain flexural modulus, certain densities, certain tensile modulus, certain surface tension, good melt viscosity, good clarity, and good color.

In one embodiment, certain polyester compositions useful in this disclosure can be visually clear. The term "visually clear" is defined herein as an appreciable absence of cloudiness, haziness, and/or muddiness, when inspected visually.

The polyester portion of the polyester compositions useful in this disclosure can be made by processes known from the literature, for example, by processes in homogenous solution, by transesterification processes in the melt, and by two phase interfacial processes. Suitable methods include, but are not limited to, the steps of reacting one or more dicarboxylic acids with one or more diols at a temperature of 100° C. to 315° C. at a pressure of 0.1 to 760 mm Hg for a time sufficient to form a polyester. See U.S. Pat. No. 3,772,405 for methods of producing polyesters, the disclosure regarding such methods is hereby incorporated herein by reference.

The polyester in general may be prepared by condensing the dicarboxylic acid or dicarboxylic acid ester with the did in the presence of a catalyst at elevated temperatures increased gradually during the course of the condensation up to a temperature of about 225° C. to 310° C., in an inert atmosphere, and conducting the condensation at low pressure during the latter part of the condensation, as described in further detail in U.S. Pat. No. 2,720,507 incorporated herein by reference herein.

In some embodiments, during the process for making the polyesters useful in the present disclosure, certain agents which colorize the polymer can be added to the melt including toners or dyes. In one embodiment, a bluing toner is added to the melt in order to reduce the b* of the resulting polyester polymer melt phase product. Such bluing agents include blue inorganic and organic toner(s) and/or dyes. In addition, red toner(s) and/or dyes can also be used to adjust the a* color. Organic toner(s), e.g., blue and red organic toner(s), such as those toner(s) described in U.S. Pat. Nos. 5,372,864 and 5,384,377, which are incorporated by reference in their entirety, can be used. The organic toner(s) can be fed as a premix composition. The premix composition may be a neat blend of the red and blue compounds or the composition may be pre-dissolved or slurried in one of the polyester's raw materials, e.g., ethylene glycol.

The total amount of toner components added can depend on the amount of inherent yellow color in the base polyester and the efficacy of the toner. In one embodiment, a concentration of up to about 15 ppm of combined organic toner components and a minimum concentration of about 0.5 ppm can be used. In one embodiment, the total amount of bluing additive can range from 0.5 to 10 ppm. In an embodiment, the toner(s) can be added to the esterification zone or to the polycondensation zone. Preferably, the toner(s) are added to the esterification zone or to the early stages of the polycondensation zone, such as to a prepolymerization reactor.

The present disclosure further relates to polymer blends. In one embodiment, the polymer blend comprises:
 (a) from 5 to 95 weight % of the polyester compositions of the invention described herein; and
 (b) from 5 to 95 weight % of at least one polymeric component.

Suitable examples of the polymeric components include, but are not limited to, nylon; polyesters different than those described herein; polyamides such as ZYTEL® from DuPont; polystyrene; polystyrene copolymers; styrene acrylonitrile copolymers; acrylonitrile butadiene styrene copolymers; poly(methyl methacrylate); acrylic copolymers; poly(ether-imides) such as ULTEM® (a poly(ether-imide) from General Electric); polyphenylene oxides such as poly (2,6-dimethylphenylene oxide) or poly(phenylene oxide)/polystyrene blends such as NORYL 1000® (a blend of poly(2,6-dimethylphenylene oxide) and polystyrene resins from General Electric); polyphenylene sulfides; polyphenylene sulfide/sulfones; poly(ester-carbonates); polycarbonates such as LEXAN® (a polycarbonate from General Electric); polysulfones; polysulfone ethers; and poly(etherketones) of aromatic dihydroxy compounds; or mixtures of any of the foregoing polymers. In one embodiment, aliphatic-aromatic polyesters can be excluded from the polyester compositions useful in this disclosure. The following polyesters, which can be blended to make the polyester compositions of this disclosure, can be excluded as the polymeric components used in additional blending if such blending exceeds the compositional ranges of the invention: polyethylene terephthalate (PET), glycol modified PET (PETG), glycol modified poly(cyclohexylene dimethylene terephthalate) (PCTG), poly(cyclohexylene dimethylene terephthalate) (PCT), acid modified poly(cyclohexylene dimethylene terephthalate) (PCTA), polybutylene terephthalate) and/or diethylene glycol modified PET (EASTOBONDT™ copolyester).

The blends can be prepared by conventional processing techniques known in the art, such as melt blending or solution blending.

In embodiments, the polyester compositions and the polymer blend compositions can also contain from 0.01 to 25% by weight of the overall composition common additives such as colorants, toner(s), dyes, mold release agents, flame retardants, plasticizers, glass bubbles, nucleating agents, stabilizers, including but not limited to, UV stabilizers, thermal stabilizers, and/or reaction products thereof, fillers, and impact modifiers. Examples of commercially available impact modifiers include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the polyester composition.

Reinforcing materials may be added to the compositions useful in this disclosure. The reinforcing materials may include, but are not limited to, carbon filaments, silicates, mica, clay, talc, titanium dioxide, Wollastonite, glass flakes, glass beads and fibers, and polymeric fibers and combinations thereof. In one embodiment, the reinforcing materials include glass, such as, fibrous glass filaments, mixtures of glass and talc, glass and mica, and glass and polymeric fibers.

Generally, the shrink films according to the present disclosure may contain from 0.01 to 10 weight percent of the polyester plasticizer. In one embodiment, the shrink films can contain from 0.1 to 5 weight percent of the polyester plasticizer. Generally, the shrink films can contain from 90 to 99.99 weight percent of the copolyester. In certain embodiments, the shrink films can contain from 95 to 99.9 weight percent of the copolyester.

In one aspect, the present disclosure relates to shrink film(s) and molded article(s) of this disclosure comprising the polyester compositions and/or polymer blends useful in this disclosure. The methods of forming the polyesters and/or blends into film(s) and/or sheet(s) are well known in the art. Examples of film(s) and/or sheet(s) useful the present disclosure include but not are limited to extruded film(s) and/or sheet(s), compression molded film(s), calendered film(s) and/or sheet(s), solution casted film(s) and/or sheet(s). In one aspect, methods of making film and/or sheet useful to produce the shrink films of the present disclosure include but are not limited to extrusion, compression molding, calendering, and solution casting The shrink films of the present disclosure can have an onset of shrinkage temperature of from about 55 to about 80° C., or about 55 to about 75° C., or about 55 to about 70° C. Shrink initiation temperature is the temperature at which the onset of shrinking occurs.

In certain embodiments, the polyester compositions useful in the present disclosure can have densities of 16 g/cc or less, or 1.5 g/cc or less, or 1.4 g/cc or less, or 1.1 g/cc to 1.5 g/cc, or 1.2 g/cc to 1.4 g/cc, or 1.2 g/cc to 1.35 g/cc.

One approach for reducing the density is to introduce many small voids or holes into the shaped article. This process is called "voiding" and may also be referred to as "cavitating" or "microvoiding". Voids are obtained by incorporating about 5 to about 50 weight % of small organic or inorganic particles or "inclusions" (referred in the art as "voiding" or "cavitation" agents) into a matrix polymer and orienting the polymer by stretching in at least one direction. During stretching, small cavities or voids are formed around the voiding agent. When voids are introduced into polymer films, the resulting voided film not only has a lower density than the non-voided film, but also becomes opaque and develops a paper-like surface. This surface also has the advantage of increased printability; that is, the surface is capable of accepting many inks with a substantially greater capacity over a non-voided film. Typical examples of voided films are described in U.S. Pat. Nos. 3,426,754; 3,944,699; 4,138,459; 4,582,752; 4,632,869; 4,770,931; 5,176,954; 5,435,955; 5,843,578; 6,004,664; 6,287,680; 6,500,533; 6,720,085; U.S. Patent Application Publication No.'s 2001/0036545; 2003/0068453; 2003/0165671; 2003/0170427; Japan Patent Application No.'s 61-037827; 63-193822; 2004-181863; European Patent No, 0 581 970 B1, and European Patent Application No. 0 214 859 A2.

In certain embodiments, the as extruded films are oriented while they are stretched. The oriented films or shrinkable films of the present disclosure can be made from films having any thickness depending on the desired end-use. The desirable conditions are, in one embodiment, where the oriented films and/or shrinkable films can be printed with ink for applications including labels, photo films which can be adhered to substrates such as paper, and/or other applications that it may be useful in. It may be desirable to coextrude the polyesters useful in the present disclosure with another polymer, such as PET, to make the films useful in making the oriented films and/or shrink films of this disclosure. One advantage of doing the latter is that a tie layer may not be needed in some embodiments.

In one embodiment, the monoaxially and biaxially oriented films of the present disclosure can be made from films having a thickness of about 100 to 400 microns, for example, extruded, cast or calendered films, which can be stretched at a ratio of 6.5:1 to 3:1 at a temperature of from the Tg of the film to the Tg+55 deg C., and which can be stretched to a thickness of 20 to 80 microns. In one embodiment, the orientation of the initial as extruded film can be performed on a tenter frame according to these orientation conditions. The shrink films of the present disclosure can be made from the oriented films of this disclosure.

In certain embodiments, the shrink films of the present disclosure have gradual shrinkage with little to no wrinkling. In certain embodiments, the shrink films of the present disclosure have no more than 40% shrinkage in the transverse direction per 5° C. temperature increase increment.

In certain embodiments of the present disclosure, the shrink films of this disclosure have shrinkage in the machine direction of from 4% or less, or 3% or less, or 2.5% or less, or 2% or less, or no shrinkage when immersed in water at 65° C. for 10 seconds. In certain embodiments of the present disclosure, the shrink films of this disclosure have shrinkage in the machine direction of from −5% to 4%, −5% to 3%, or −5% to 2.5%, or −5% to 2%, or −4% to 4%, or −3% to 4% or −2% to 4%, or −2% to 2.5%, or −2% to 2%, or 0 to 2%, or no shrinkage, when immersed in water at 65° C. for 10 seconds. Negative machine direction shrinkage percentages here indicate machine direction growth. Positive machine direction shrinkages indicate shrinkage in the machine direction.

In certain embodiments of the present disclosure, the shrink films of this disclosure have shrinkage in the main shrinkage direction of from 50% or greater, or 60% or greater, or 70% or greater, when immersed in water at 95° C. for 10 seconds.

In certain embodiments of the present disclosure, the shrink films of this disclosure have shrinkage in the main shrinkage direction in the amount of 50 to 90% and shrinkage in the machine direction of 4% or less, or from −5% to 4%, when immersed in water at 95° C. for 10 seconds.

In one embodiment, the polyesters useful in the present disclosure are made into films using any method known in the art to produce films from polyesters, for example, solution casting, extrusion, compression molding, or calendering. The as extruded (or as formed) film is then oriented in one or more directions (e.g., monoaxially and/or biaxially oriented film). This orientation of the films can be performed by any method known in the art using standard orientation conditions. For example, the monoaxially oriented films of the present disclosure can be made from films having a thickness of about 100 to 400 microns, such as, extruded, cast or calendered films, which can be stretched at a ratio of 6.5:1 to 3:1 at a temperature of from the Tg of the film to the Tg+55 deg C., and which can be stretched to a thickness of 20 to 80 microns. In one embodiment, the orientation of the initial as extruded film can be performed on a tenter frame according to these orientation conditions.

In certain embodiments of the present disclosure, the shrink films of this disclosure have no more than 40% shrinkage in the transverse direction per 5° C. temperature increase increment.

In certain embodiments of the present disclosure, the shrink films of this disclosure can have an onset of shrinkage temperature of from about 55 to about 80° C., or about 55 to about 75° C., or 55 to about 70° C. Onset of shrinkage temperature is the temperature at which onset of shrinking occurs.

In certain embodiments of the present disclosure, the shrink films of this disclosure can have an onset of shrinkage temperature of between 55° C. and 70° C.

In certain embodiments of the present disclosure, the shrink films of this disclosure can have a break strain percentage greater than 200% at a stretching speed of 500 mm/minute in the direction orthogonal to the main shrinkage direction according to ASTM Method D882

In certain embodiments of the present disclosure, the shrink films of this disclosure can have a break strain percentage of greater than 300% at a stretching speed of 500 mm/minute in the direction orthogonal to the main shrinkage direction according to ASTM Method D882.

In certain embodiments of the present disclosure, the shrink films of this disclosure can have a tensile stress at break (break stress) of from 20 to 400 MPa; or 40 to 260 MPa; or 42 to 260 MPa as measured according to ASTM Method D882.

In certain embodiments of the present disclosure, the shrink films of this disclosure can have a shrink force of from 4 to 18 MPa, or from 4 to 15 MPa, as measured by ISO Method 14616 depending on the stretching conditions and the end-use application desired. For example, certain labels made for plastic bottles can have an MPa of from 4 to 8 and certain labels made for glass bottles can have a shrink force of from 10 to 14 Mpa as measured by ISO Method 14616 using a Shrink Force Tester made by LabThink @ 80° C.

In one embodiment of the present disclosure, the polyester compositions can be formed by reacting the monomers by known methods for making polyesters in what is typically referred to as reactor grade compositions.

In one embodiment of the present disclosure, the polyester compositions of this disclosure can be formed by blending polyesters, such as polyethylene terephthalate (PET), glycol modified PET (PETG), glycol modified poly(cyclohexylene dimethylene terephthalate) (PCTG), poly(cyclohexylene dimethylene terephthalate) (PCT), acid modified poly(cyclohexylene dimethylene terephthalate) (PCTA), polybutylene terephthalate) and/or diethylene glycol modified PET (EASTOBOND™ copolyester) to achieve the monomer ranges of these compositions.

In certain embodiments, the polyester compositions and the polymer blend compositions can also contain from 0.01 to 25% by weight of the overall composition common additives such as colorants, toner(s), dyes, mold release agents, flame retardants, plasticizers, glass bubbles, nucleating agents, stabilizers, including but not limited to, UV stabilizers, thermal stabilizers and/or reaction products thereof, fillers, and impact modifiers, Examples of commercially available impact modifiers include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the polyester composition.

Reinforcing materials can be added to the polyester compositions useful in this disclosure. The reinforcing materials may include, but are not limited to, carbon filaments, silicates, mica, clay, talc, titanium dioxide, Wollastonite, glass flakes, glass beads and fibers, and polymeric fibers and combinations thereof. In one embodiment, the reinforcing materials include glass, such as, fibrous glass filaments, mixtures of glass and talc, glass and mica, and glass and polymeric fibers.

Molded articles can also be manufactured from any of the polyester compositions disclosed herein which may or may not consist of or contain shrink films and are included within the scope of the present disclosure.

Generally, the shrink films according to the present disclosure may contain from 0.01 to 10 weight percent of the polyester plasticizer. In one embodiment, the shrink films can contain from 0.1 to 5 weight percent of the polyester plasticizer. Generally, the shrink films can contain from 90 to 99.99 weight percent of the copolyester. In certain embodiments, the shrink films can contain from 95 to 99.9 weight percent of the copolyester.

In one embodiment, when having a pre-oriented thickness of about 100 to 400 microns and then oriented on a tenter frame at from a ratio of 6.5:1 to 3:1 at a temperature of from Tg to Tg+55° C. to a thickness of from about 20 to about 80 microns, the shrink films of the present disclosure can have one or more of the following properties:

(1) shrinkage in the main shrinkage direction or transverse direction in the amount of greater than 60% (or greater than 70%), and 4% or less (or from −5% to 4%) shrinkage in the machine direction when immersed in water at 95° C. for 10 seconds; (2) an onset of shrinkage temperature of from about 55° C. to about 70° C.; (3) a break strain percentage of greater than 200% at stretching speeds of 500 mm/minute, or 200 to 600%, or 200 to 500%, or 226 to 449%, or 250 to 455% in the transverse direction or in the machine direction or in both directions according to ASTM Method D882; and/or (4) no more than 40% shrinkage per each 5° C. temperature increase increment. Any combination of these properties or all of these properties can be present in the shrink films of this disclosure. The shrink films of the present disclosure can have a combination of two or more of the above described shrink film properties. The shrink films of the present disclosure can have a combination of three or more of the above described shrink film properties. The shrink films of the present disclosure can have a combination of four or more of the above described shrink film properties. In certain embodiments, properties (1)-(2) are present. In certain embodiments, properties (1)-(4) are present. In certain embodiments, properties (1)-(3) are present, etc.

The shrinkage percentages herein are based on initial pre-shrunk films having a thickness of about 20 to 80 microns that have been oriented at a ratio of from 6.5:1 to 3:1 at a temperature of Tg to Tg+55° C. on a tenter frame, for example, at a ratio of 5:1 at a temperature from 70° C. to 85° C. In one embodiment, the shrinkage properties of the oriented films used to make the shrink films of this disclosure were not adjusted by annealing the films at a temperature higher than the temperature in which it was oriented.

The shape of the films useful in making the oriented films or shrink films of the present disclosure is not restricted in any way. For example, it may be a flat film or a film that has been formed into a tube. In order to produce the shrink films useful in the present disclosure, the polyester is first formed into a flat film and then is "uniaxially stretched", meaning the polyester film is oriented in one direction. The films could also be "biaxially oriented," meaning the polyester films are oriented in two different directions; for example, the films are stretched in both the machine direction and a direction different from the machine direction. Typically, but not always, the two directions are substantially perpendicular. For example, in one embodiment, the two directions are in the longitudinal or machine direction ("MD") of the film (the direction in which the film is produced on a film-making machine) and the transverse direction ("TD") of the film (the direction perpendicular to the MD of the film). Biaxially oriented films may be sequentially oriented, simultaneously oriented, or oriented by some combination of simultaneous and sequential stretching.

The films may be oriented by any usual method, such as the roll stretching method, the long-gap stretching method, the tenter-stretching method, and the tubular stretching method. With use of any of these methods, it is possible to conduct biaxial stretching in succession, simultaneous biaxial stretching, uni-axial stretching, or a combination of these. With the biaxial stretching mentioned above, stretching in the machine direction and transverse direction may be done at the same time. Also, the stretching may be done first in one direction and then in the other direction to result in effective biaxial stretching. In one embodiment, stretching of the films is done by preliminarily heating the films 5° C. to 80° C. above their glass transition temperature (Tg). In one embodiment, the films can be preliminarily heated from 10° C. to 30° C. above their Tg. In one embodiment, the stretch rate is from 5 to 20 inches (12.7 to 50.8 cm) per second. Next, the films can be oriented, for example, in either the machine direction, the transverse direction, or both directions from 2 to 6 times the original measurements. The films can be oriented as a single film layer or can be coextruded with another polyester such as PET (polyethylene terephthalate) as a multilayer film and then oriented.

In one embodiment, the present disclosure includes an article of manufacture or a shaped article comprising the shrink films of any of the shrink film embodiments of this disclosure. In another embodiment, the present disclosure includes an article of manufacture or a shaped article comprising the oriented films of any of the oriented film embodiments of this disclosure.

In certain embodiments, the present disclosure includes but is not limited to shrink films applied to containers, plastic bottles, glass bottles, packaging, batteries, hot fill containers, and/or industrial articles or other applications. In one embodiment, the present disclosure includes but is not limited to oriented films applied to containers, packaging, plastic bottles, glass bottles, photo substrates such as paper, batteries, hot fill containers, and/or industrial articles or other applications.

In certain embodiments of the present disclosure, the shrink films of this disclosure can be formed into a label or sleeve. The label or sleeve can then be applied to an article of manufacture, such as, the wall of a container, battery, or onto a sheet or film.

The oriented films or shrink films of the present disclosure can be applied to shaped articles, such as, sheets, films, tubes, bottles and are commonly used in various packaging applications. For example, films and sheets produced from polymers such as polyolefins, polystyrene, polyvinyl chloride), polyesters, polylactic acid (PLA) and the like are used frequently for the manufacture of shrink labels for plastic beverage or food containers. For example, the shrink films of the present disclosure can be used in many packaging applications where the shaped article exhibits properties, such as, good printability, high opacity, higher shrink force, good texture, and good stiffness.

The combination of the improved shrink properties as well as the improved toughness should offer new commercial options, including but not limited to, shrink films applied to containers, plastic bottles, glass bottles, packaging, batteries, hot fill containers, and/or industrial articles or other applications.

The following examples further illustrate how the polyesters of the present disclosure can be made and evaluated, and are intended to be purely exemplary and are not intended to limit the scope thereof. Unless indicated otherwise, parts are parts by weight, temperature is in degrees C. (Celsius) or is at room temperature, and pressure is at or near atmospheric.

Examples

Representative samples were made by blending previously prepared samples of polyester resins in an extruder and making a film in situ. The composition of the resins prior to blending is shown in Table 1. Once made, the extruded films were analyzed to measure monomer compositions and film properties.

Resin samples were dried in a desiccant drier at 60° C., and then blended and extruded into films using two different processes. In the lab-scale process (Film examples 1 and 7), films with a thickness of 10 mils (250 microns) were extruded using a 2.5" Davis and Standard extruder. Once extruded, the films were cut and stretched on a Bruckner Karo 4 tenter frame to approximately a 5:1 stretch ratio and to a final thickness of 50 microns. In the commercial process, for Examples 2-6 and 8-13, the films were made on a commercial tenter line where the extruded films are stretched directly after extrusion. These films were stretched under approximately the same conditions as the films made with the lab-scale process to about a 5:1 stretch ratio and to a thickness of 50 microns.

The diol content of the extruded film compositions was determined via NMR. The acid component of the blended polymers used in the examples herein was 100 mole % terephthalic acid. The total mole percentages of the diol component equaled 100 mole % and the total mole percentages of the acid component equaled 100 mole %, The compositions of the final films are shown in Table 2. All NMR spectra were recorded on a JEOL Eclipse Plus 600 MHz nuclear magnetic resonance spectrometer using either chloroform-trifluoroacetic acid (70-30 volume/volume) for polymers or, for oligomeric samples, 60/40 (wt/wt) phenol/tetrachloroethane with deuterated chloroform added for lock. The inherent viscosity of the polyesters herein was determined in 60/40 (wt/wt) phenol/tetrachloroethane at a concentration of 0.5 g/100 ml at 25° C., and is reported in dL/g.

TABLE 1

| | Composition of Resins Prior to Blending | | | |
|---|---|---|---|---|
| Polyester # | EG content (%) | CHDM content (%) | NPG content (%) | DEG content (%) |
| 1 | 63 | 0 | 0 | 37 |
| 2 | 66 | 32 | 0 | 2 |
| 3 | 71 | 0 | 26 | 3 |
| 4 | 94 | 3 | 0 | 3 |
| 5 | 0 | 0 | 100 | 0 |
| 6 | 64 | 24 | 0 | 12 |

Shrinkage was measured after soaking stretched film samples in heated water at the corresponding temperatures from 65° C. to 95° C., as specified herein, with a dwell time of 10 seconds. Shrinkage was measured in the direction orthogonal to the main shrinkage direction (machine direction, MD) at 65° C. and was also measured in the main shrinkage direction (transverse direction, TD) at 85° C. and 95° C. Shrinkage is measured herein by placing a 50 mm by 50 mm square film sample in water at a specific temperature for 10 seconds without restricting shrinkage in any direction. The percent shrinkage is then calculated by the following equation:

% shrinkage=[(50 mm−length after shrinkage)/ 50 mm]×100%.

Shrink force is measured for the examples herein with a LabThink FST-02 Thermal Shrinkage Tester in MPa.

Tensile film properties were measured for the examples herein using ASTM Method D882. Multiple film stretching speeds (300 mm/min and 500 mm/min) were used to evaluate the films.

The glass transition temperature (Tg) of the polyesters is determined using a TA DSC 2920 from Thermal Analyst Instrument at a scan rate of 20° C./min.

machine direction (MD) at 65° C. and shrinkage in the transverse direction (TD) at 85° C. and 95° C. are described in Table 3.

TABLE 3

Effect on Tg, Shrink force, Shrinkage and Break Strain

| Example | Tg (° C.) | break strain (%) 300 mm/min | break strain (%) 500 mm/min | SF (MPa) | MD Shrinkage @ 65 C. (%) | TD Shrinkage @ 85 C. (%) | TD Shrinkage @ 95 C. (%) |
|---|---|---|---|---|---|---|---|
| 1 | 67 | 89 | 4 | 7 | −1 | 68 | 74 |
| 2 | 67 | 3 | 12 | 7 | 0.5 | 70 | 78 |
| 3 | 70 | 447 | 30 | 6 | 0 | 72 | 78 |
| 4 | 68 | 423 | 35 | 8 | −0.5 | 74 | 78 |
| 5 | 68 | 443 | 45 | 10 | 0 | 76 | 78 |
| 6 | 71 | 337 | 226 | 8 | 1 | 74 | 79 |
| 7 | 79 | 257 | 274 | 8 | 0 | 56 | 74 |
| 8 | 76 | 380 | 357 | 9 | −0.5 | 73 | 79 |
| 9 | 77 | 357 | 362 | 10 | 1 | 76 | 79 |
| 10 | 74 | 401 | 385 | 11 | 1 | 73 | 78 |
| 11 | 71 | 382 | 397 | 11 | 2 | 78 | 79 |
| 12 | 71 | 395 | 407 | 11 | 1.5 | 71 | 77 |
| 13 | 72 | 398 | 439 | 10 | 3.5 | 73 | 77 |

TABLE 2

Diol Monomer Content of Extruded Films

| Example | EG | NPG | CHDM | DEG | total amorphous monomer |
|---|---|---|---|---|---|
| 1 | 62 | 26 | 0 | 12 | 38 |
| 2 | 68 | 9 | 11 | 12 | 32 |
| 3 | 65 | 0 | 23 | 12 | 35 |
| 4 | 68 | 14 | 6 | 12 | 32 |
| 5 | 68 | 14 | 6 | 12 | 32 |
| 6 | 69 | 11 | 12 | 9 | 31 |
| 7 | 73 | 0 | 25 | 2 | 25 |
| 8 | 71 | 26 | 0 | 3 | 29 |
| 9 | 73 | 21 | 4 | 2 | 27 |
| 10 | 75 | 14 | 6 | 5 | 25 |
| 11 | 68 | 12 | 11 | 9 | 32 |
| 12 | 75 | 13 | 3 | 9 | 25 |
| 13 | 73 | 6 | 12 | 9 | 27 |

Films described in Table 2 have good shrinkage, i.e., shrinkage in the machine direction at 65° C. ranging from −1 to 3.5% and shrinkage in the transverse direction at 85° C. ranging from 56-78%, and even higher ultimate shrinkage at 95° C. Tg, break strain, shrink force, shrinkage in the Example 3, which is the composition of a commercial shrink film, did not contain NPG as shown above in Table 2. Films that are produced from Examples 1-13 of Tables 2 have good shrinkage, i.e., shrinkage in the machine direction at 65° C. ranging from −1% to 3.5% and shrinkage in the transverse direction at 95° C. ranging from 74% to 79%. Examples 1-13 demonstrated shrinkage in the machine direction at 65° C. ranging from −1% to 3.5% and high shrinkage in the transverse direction at 95° C., and also had other good film properties. All of the Examples in Table 3 had good break strain percentages in the range of from 257% to 447% at a film stretching speed of 300 mm/min except for examples 1 and 2. Unpredictably, as shown in Table 3, the break strain percentages for the films of this disclosure were in the range of from 226% to 439% at a film stretching speed of 500 mm/min except for examples 1 thru 5, which had break strain values less than 100%.

Table 3 also shows good shrink force of the films which was demonstrated to be in the range of 6-11 MPa (megapascals). Additionally, it was found that the shrink force was strongly dependent upon the concentration of ethylene glycol and diethylene glycol. Films that contain an increasing amount of EG also have a higher shrink force. Films that contain an increasing amount of DEG have a lower shrink force.

It can be seen from a comparison of the data in the above working examples that the shrink films of the present disclosure unpredictably achieve at least one or more of the following properties which were objectives of this disclosure: good onset of shrinkage temperatures, good shrink force, good break stress and strain, good shrinkage properties in the transverse direction and in the machine direction, and/or good ultimate shrinkage (shrinkage at the highest temperature, e.g. at 95° C.).

It can also be seen from a comparison of the data in the above relevant working examples that the shrink films of the present disclosure have at least one or more of the following properties: certain properties including those above and/or at least one of the following desirable shrink film properties: (1) a shrinkage percentage which increases gradually and in a controlled manner with increasing temperature, (2) a shrink force low enough to prevent crushing of the underlying container, (3) a high ultimate shrinkage (for example, 60% or greater in the transverse direction), and (4) good film toughness so as to prevent unnecessary fracturing, breaking, tearing, splitting, bubbling, or wrinkling of the film prior to and after shrinkage.

The present disclosure has been described in detail with reference to the embodiments described herein, but it will be understood that variations and modifications can be effected within the scope of this disclosure.

What is claimed is:

1. A shrink film comprising a polyester composition comprising:
   (1) at least one polyester which comprises:
      (a) a dicarboxylic acid component comprising:
         (i) about 70 to about 100 mole % of terephthalic acid residues;
         (ii) about 0 to about 30 mole % of aromatic and/or aliphatic dicarboxylic acid residues having up to 20 carbon atoms; and
      (b) a diol component comprising:
         (i) about 0.01 to about 30 mole % neopentyl glycol residues;
         (ii) about 0.01 to about less than 15 mole % 1,4-cyclohexanedimethanol residues;
         (iii) about 50 to 90 mole % ethylene glycol residues; and
         (iv) about 2 to 15 mole % total diethylene glycol residues in the final polyester composition;
   wherein the total mole % of the dicarboxylic acid component is 100 mole %, and wherein the total mole % of the diol component is 100 mole %.

2. The shrink film of claim 1, wherein the inherent viscosity of the polyester is from 0.50 to 0.80 dL/g as determined in 60/40 (wt/wt) phenol/tetrachloroethane at a concentration of 0.25 g/50 ml at 25° C.

3. The shrink film of claim 1, wherein the polyester has a Tg of from 60° C. to 80° C. as determined using a TA DSC 2920 from Thermal Analyst Instrument at a scan rate of 20° C./min.

4. The shrink film of claim 1, wherein the sum of one or more diol monomer components capable of forming an amorphous component in the final polyester composition is from 25 to 45 mole % wherein the total diol component is 100 mole %.

5. The shrink film of claim 1, wherein the sum of the residues of 1,4-cyclohexanedimethanol and neopentyl glycol in the final polyester composition is from 20 to 40 mole % wherein the total diol component is 100 mole %.

6. The shrink film of claim 1, wherein the ethylene glycol residues are present in an amount of 65 to 75 mole %.

7. The shrink film of claim 1, wherein the 1,4-cyclohexanedimethanol residues are present in an amount of 1 to about 10 mole %.

8. The shrink film of claim 1, wherein the diethylene glycol residues are present in an amount of 2 to 12 mole %.

9. The shrink film of claim 1, wherein the diethylene glycol residues are present in an amount of 2 to 9 mole %.

10. The shrink film of claim 1, wherein the 1,4-cyclohexanedimethanol residues are present in an amount of 0.01 to about 10 mole %, diethylene glycol residues are present in an amount of 2 to 9 mole %, neopentyl glycol residues in an amount of 5 to 30 mole %, and ethylene glycol residues are present in an amount of 65 mole % or greater.

11. The shrink film of claim 10, wherein the 1,4-cyclohexanedimethanol residues are present in an amount of 2 to 7 mole %, diethylene glycol residues are present in an amount of less than 10 mole %, neopentyl glycol residues in an amount of 10 to 20 mole %, and ethylene glycol residues are present in an amount of greater than 60 mole %.

12. The shrink film of claim 1, further comprising at least one voiding agent.

13. The shrink film of claim 1, wherein the film is oriented in one or more directions.

14. The shrink film of claim 13, wherein the film has a break strain percentage of 200 to 600% at 500 mm/min as measured according to ASTM Method D882.

15. The shrink film of claim 13, wherein the film has shrinkage in the machine direction of 4% or less when immersed in water at 65° C. for 10 seconds.

16. The shrink film of claim 13, wherein the film has shrinkage in the transverse direction of 60% or greater when immersed in water at 85° C. for 10 seconds.

17. The shrink film of claim 13, wherein the film has a shrink force of 5 MPa or greater.

18. The shrink film of claim 13, wherein the film has a pre-oriented thickness of about 50 to 400 microns and is oriented on a tenter frame at a ratio of 6.5:1 to 3:1 at a temperature from the Tg of the film to the Tg plus 55° C. to a thickness from about 10 to about 80 microns.

19. The shrink film of claim 13, wherein the film has shrinkage in the transverse direction in the amount of 50 to 90% and shrinkage in the machine direction of 4% or less when immersed in water at 95° C. for 10 seconds.

20. A label or a sleeve applied to an article of manufacture, a shaped article, a container, a plastic bottle, a glass bottle, packaging, a battery, a hot fill container, or an industrial article comprising the shrink film of claim 1, claim 12 or claim 13.

21. The shrink film of claim 1, wherein the residues of 1,4-cyclohexanedimethanol are present in an amount of less than 10 mole%.

* * * * *